United States Patent [19]

Meister et al.

[11] Patent Number: 4,459,636
[45] Date of Patent: Jul. 10, 1984

[54] ELECTRICAL CONNECTORS FOR CAPACITORS, IMPROVED CAPACITORS AND ASSEMBLIES THEREOF USING SAME

[75] Inventors: Otto Meister, Hochbrueck, Fed. Rep. of Germany; Raymond P. O'Leary, Evanston; Thomas J. Tobin, Northbrook, both of Ill.

[73] Assignee: S&C Electric Company, Chicago, Ill.

[21] Appl. No.: 334,481

[22] Filed: Dec. 24, 1981
(Under 37 CFR 1.47)

[51] Int. Cl.³ .......................................... H01G 1/147
[52] U.S. Cl. .......................... 361/321; 361/329
[58] Field of Search .............. 361/321, 328, 329; 252/511; 338/99, 104

[56] References Cited

U.S. PATENT DOCUMENTS

| | | | |
|---|---|---|---|
| 3,325,708 | 6/1967 | Mankoff et al. | 361/275 |
| 3,522,495 | 8/1970 | Devins et al. | 361/329 |
| 3,586,934 | 6/1971 | Nakata | 361/321 |
| 3,670,222 | 6/1972 | Nakata et al. | 361/329 |
| 4,210,895 | 7/1980 | Sado et al. | 338/99 |
| 4,298,902 | 11/1981 | Weigel et al. | 361/321 |
| 4,304,987 | 12/1981 | van Konynenburg | 252/511 |

Primary Examiner—Roy N. Envall, Jr.
Assistant Examiner—Alfred S. Keve
Attorney, Agent, or Firm—Kirkland & Ellis

[57] ABSTRACT

Apparatus for making electrical connection to a ceramic capacitor so that electrical stress concentrations at the edge of each capacitor electrode are minimized. The apparatus includes a conductive elastomer pad which is larger than the electrode and a conductive body which presses the pad against the electrode. This pressing slightly deforms the pad over, and into good electrical and mechanical contact with, the edge of the electrode to minimize electrical stress thereat. Preferably, the conductive body is as large as the electrode. The conductive body may be an adjacent capacitor; in this way an electrical stress-free stack of capacitors may be formed and used to construct a device such as a voltage divider.

32 Claims, 19 Drawing Figures

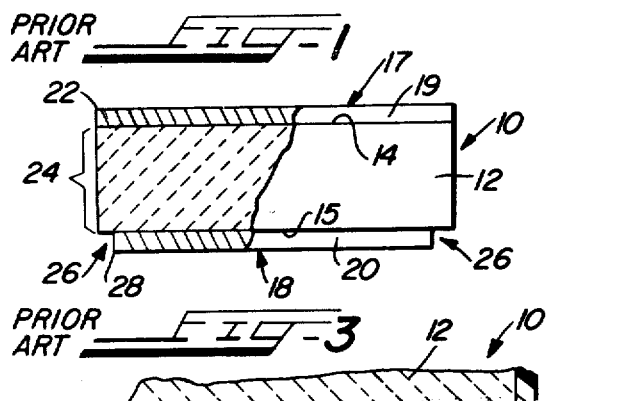
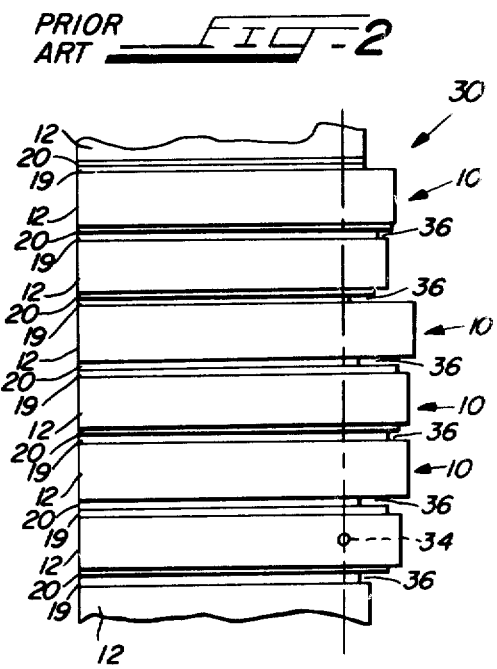
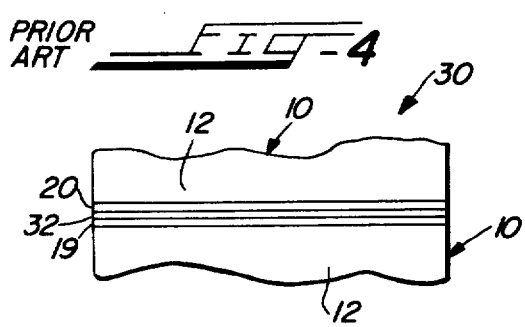
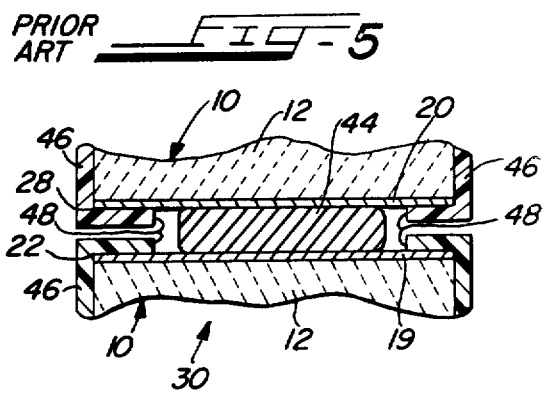
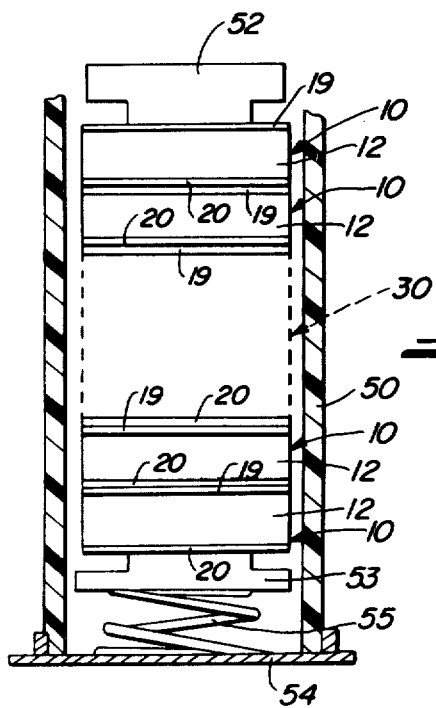

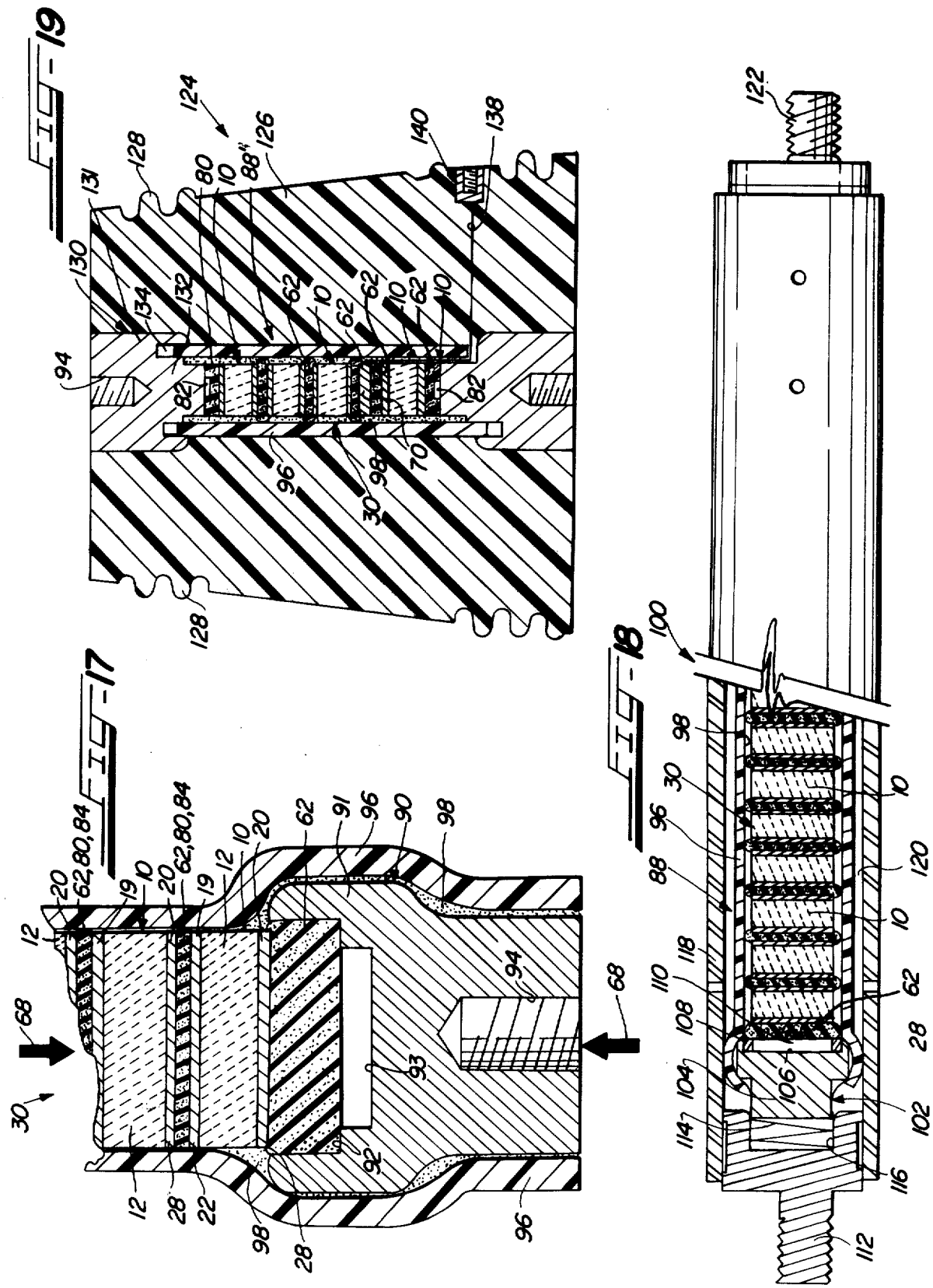

ELECTRICAL CONNECTORS FOR CAPACITORS, IMPROVED CAPACITORS AND ASSEMBLIES THEREOF USING SAME

BACKGROUND OF THE INVENTION

1. Field of the Invention

The present invention relates to improved apparatus for making electrical connection to an electrode of a capacitor, and more specifically, to improved apparatus for making electrical connection to an electrode of a ceramic capacitor so that electrical stress concentrations at the edge of the electrode are minimized and so that the possibility of damage to the brittle ceramic substrate of the capacitor is minimized. Additionally, the present invention relates to apparatus of the type described above for making electrical connection to both electrodes of a ceramic capacitor, to a subassembly of capacitors using the electrical connection apparatus, to an assembly of capacitors using the subassembly, to a capacitor rod which includes the capacitor assembly, and to a capacitive voltage divider using the capacitor rod.

2. Prior Art

Ceramic capacitors are well known as is their use in conjunction with high-voltage-circuits. Typically, ceramic capacitors include a ceramic substrate, usually made of barium titanate, which has a very high dielectric constant (on the order of several hundred to several thousand with respect to air) and a very high dielectic strength (on the order ot 50 to 300 volts/mil). Typically, the substrates take the form of thin, round or rectangular disks having two opposed major surface areas. Capacitor electrodes are typically formed by applying to the two surface areas of the substrate a silver dispersion which is fused to the ceramic disk at high temperature. Because of the high dielectric constant and strength of the barium titanate substrates, ceramic capacitors exhibit very large capacitances and very high withstand voltages for their size. Ceramic capacitors do exhibit some voltage and thermal sensitivity. That is, the amount of capacitance exhibited by a ceramic capacitor and its withstand voltage are, to some extent, dependent upon the voltage applied to the capacitor and the temperature thereof. Because barium titanate exhibits piezoelectric properties, the substrate may expand or contract (electrostriction) when the capacitor is discharged or charged. Piezoelectric or thermal expansion or contraction of the substrate, and the brittleness of barium titanate, lead to a requirement that ceramic capacitors be utilized in packages or housings which minimize the effects of external forces applied to the capacitor and which permit the substrates to expand or contract due to electrostriction and thermal effects without cracking or breaking.

High electrical stress concentrations may occur at or near the outer edge of the silver electrodes of ceramic capacitors. These high stress concentrations may break down the dielectric surrounding the capacitors, causing flashover between the electrodes. A stack of series-connected ceramic capacitors may be formed to produce a capacitor subassembly. The high electrical stress concentrations at or near the edges of the capacitors may cause flashover between adjacent capacitors. Where ceramic capacitors are used at high voltage, if the silver electrodes thereof terminate short of the periphery of the ceramic substrate, significant stress concentrations may be present within the substrate itself between the edge of the electrode and the edge of the substrate. If adjacent capacitors in a subassembly are not accurately aligned so that their silver electrodes do not have their edges accurately aligned, flux lines emanating from an overhanging electrode crowd around the edge of an underhanging electrode as they enter the ceramic thereunder. This crowding is evidenced by increased stress concentration in the area surrounding the capacitors. If the ceramic substrates of adjacent capacitors are precisely aligned, but the peripheral edges of the silver electrodes thereon are not, undesirable high electric stress will occur in the gap between an overhanging coating and the ceramic substrate supporting the underhanging coating. Both effects may break down any air or dielectric in this gap, leading to failure of the capacitor subassembly.

The prior art exhibits a variety of facilities for attempting to reduce the flashover or electrical stress breakdown of ceramic capacitor subassemblies, as well as for attempting to reduce problems generated by the application of external forces to the capacitor subassembly by expansion and contraction of the stack due to both thermal variations and electrostriction.

Nakata in U.S. Pat. No. 3,586,934 discloses a high-voltage ceramic capacitor comprising a stack of ceramic capacitors. The facing electrodes of adjacent capacitors of the stack are bonded together, as with an epoxy cement filled with silver (or with silver solder) therebetween. The outer periphery of the bonded capacitor stack is then centerlessly ground until the silver electrodes and the barium titanate substrates have their peripheral edges precisely aligned with respect to each other about the entire periphery of the capacitor stack. A thin layer of a dielectric material is then applied to the periphery of the stack. The capacitor stack may be included in a final assembly by urging against the end electrodes metal members, one of which may be spring loaded. Nakata's centerless grinding prevents any of the silver electrodes from overhanging or underhanging and is performed in such a way that particles of the silver electrodes and of the ceramic substrates do not adhere to the periphery of the stack. Thus, there are no sharp edges, sharp points, or overhanging or underhanging conductive members; concentrated high electrical stress at the periphery of the stack is minimized. Further, the thin dielectric coating on the periphery of the stack surpresses field emissions and microdischarge-initiated breakdowns from the edge of the silver electrodes. According to Nakata, the dielectric coating must have a high resistivity, preferably in the neighborhood of $10^8$ ohms-centimeter.

The capacitor stack of the Nakata patent is rather expensive and complicated to manufacture, involving as it does both centerless grinding and the bonding together of numerous small ceramic capacitors into a stack. Further, while the centerless grinding operation, in combination with the use of the thin dielectric coating on the periphery of the stack, may reduce the possibility of flashover or electrical stress breakdown of the capacitor stack, the possibility of such events occurring still remains. Further, although the stack as a whole may expand and contract axially due to the spring loading of the metal member, radial expansion and contraction of the stack can lead to problems. Specifically, if one capacitor in the stack expands or contracts at a different rate than an adjacent capacitor in the stack, the bond between the facing silver electrodes of these two capacitors may be broken, cracked, or otherwise degraded.

Mankoff and Nakata in U.S. Pat. No. 3,325,708 disclose a high-voltage capacitor assembly similar to the above-described Nakata patent. Each capacitor in the stack is surrounded with a toroidal insulator which covers the periphery of each ceramic substrate and the edge of the silver electrodes thereon, but which exposes through its central hole the central portion of the silver electrode. Each insulator which is preferably high dielectric strength epoxy, is bonded to its capacitor with, for example, a thin varnish layer. A metallic button made of steel, which may be cadmium plated, is interposed between adjacent capacitors to electrically interconnect their facing silver electrodes. The entire stack is surrounded by an insulative tube to which are threadingly attached end terminals. The end terminals each engage a conductive end button similar to the buttons between adjacent capacitors and push these buttons against the stack. One of the end buttons may be spring-loaded. An objective of the Mankoff and Nakata patent is to eliminate failure of the bonded joint between individual surrounding capacitors, as discussed above with reference to the '934 patent. To this end, the conductive buttons are not bonded to the silver electrodes of individual capacitors, but are merely held in place by the compressive axial force exerted on the capacitor stack by the end buttons. The purpose of the high dielectric strength insulators on the peripheries of the ceramic substrates of the individual capacitors and on the edge on the silver electrodes thereof is to prevent high electrical stress concentrations from ionizing air surrounding the individual capacitors to thereby prevent flashover along the periphery of the capacitor stack. The use of the varnish to bond each insulator to its capacitor is said, by Mankoff and Nakata, to prevent air from being trapped at the interface between each insulator and its substrate and silver electrodes. In short, high electrical stress, which occurs at the edge of the silver coatings, is forced to occur within the high dielectric strength insulator which will not break down as a result thereof. Further, because of the spring-loading of one of the conductive end buttons, the capacitors in the stack can axially expand and contract freely. Moreover, unequal radial expansion or contraction of individual capacitors, according to Mankoff and Nakata, simply results in a slight relative sliding between the conductive buttons and the silver electrodes against which each bears.

The capacitor stack of the Mankoff and Nakata patent is rather complicated and expensive to manufacture. Although it apparently alleviates some of the problems previously discussed above relative to the capacitor stack of the '934 patent, it should be noted that the Mankoff and Nakata capacitor stack involves a rather crucial step, mainly, applying each insulator to its capacitor with varnish or other adhesive so as to insure that no air is trapped between the interface of the insulator and both the ceramic substrate and the edges of the silver electrodes.

Nakata, U.S. Pat. No. 3,670,222, discloses a capacitor assembly comprising a stack of individual ceramic capacitors. The structure of this Nakata patent appears to involve a combination of the structures disclosed by the previous two patents. Dutta, U.S. Pat. No. 3,731,130, and Folta, U.S. Pat. No. 3,040,385, both relate to capacitor assemblies which include, in part, heat shrinkable outer plastic sleeves for holding the capacitor assembly together. Neither of these patents appear to disclose ceramic capacitors of the type described herein. Leeds, et al., U.S. Pat. No. 4,840,670, Mashikian, et al., U.S. Pat. No. 3,673,305, Haefely, U.S. Pat. No. 2,086,078, Brafman, U.S. Pat. No. 2,777,976, and Devins, et al., U.S. Pat. No. 3,522,495, all disclose various forms of capacitor assemblies intended for use in high-voltage environments in which each assembly is ultimately contained within a ceramic or cured resin housing. Some of these patents, for example Haefely and Devins, disclose filling the housing with a high dielectric strength medium, such as a insulating oil or $SF_6$ gas. Further, some of these patents, typified by Leeds, show the need to take into consideration the fact that ceramic capacitors may expand or contract and, therefore, utilize spring-loaded terminal assemblies similar to those described above.

A general object of the present invention, then, is to provide both improved apparatus for making electrical connection to a ceramic capacitor and an improved assembly comprising a stack of capacitors utilizing the improved electrical connection apparatus so that a capacitor assembly which is inexpensive and simple to manufacture, reliable in operation, and electrically and mechanically robust is provided.

SUMMARY OF THE INVENTION

With the above and other objects in view, the present invention relates to an improved apparatus for making electrical connection to an electrode of a ceramic capacitor. The ceramic capacitor includes a high dielectric strength, high dielectric permittivity, brittle ceramic substrate, preferably of barium titanate. The electrode is a thin conductive film, preferably a silver dispersion which is deposited on a major surface of the substrate. The conductive film has a predetermined configuration and a predetermined surface area which is peripherally bounded by an edge of the film. The edge is formed by the intersection of the film's surface and a side wall of the film. The side wall has a small height dimension.

The improved apparatus includes a elastomeric conductive member, preferably conductive rubber, which has a contact surface having a configuration similar to, but larger than, the surface area of the film. Facilities are provided for pressing the contact surface of the elastomeric member sufficiently hard against the surface area of the film across an interface therebetween so as to effect good mechanical and electrical contact between the contact surface and the film. Further, the pressing facilities press the contact surface of the elastomeric member sufficiently hard against the surface area of the film so as to deform the contact surface over and into good mechanical and electrical contact with the edge thereof. In this way, electrical stress concentrations, which would normally be produced at the edge of the film, are minimized or eliminated.

The pressing facilities preferably comprise a conductive member, an end of which is urged toward the film and against the elastomeric member opposite the contact surface thereof. The end of the conductive member is an area at least as large as the surface area of the film. Also provided may be means for both insuring that the contact surface of the elastomeric member remains in firm mechanical and electrical contact with the surface and edge of the film, and which also minimizes mechanical stress which may be applied to the substrate. These facilities assure such firm engagement and the minimization of mechanical stress notwithstanding variations in the pressing of the conductive member against the elastomeric member, the application of external forces to the capacitor, thermal expansion or contraction of the capacitor, and electrostriction of the capacitor. In specific embodiments, these last-named facilities include a depression formed in the conductive member, in the elastomeric member, or in both. The depression is located at the interface between the conductive member and the elastomeric member when they are urged together. The depression generally overlies a central portion of the surface area of the film when the film and the elastomeric member are pressed together. The elastomeric member is initially slightly deformed into the depression due to the urging thereagainst of the conductive member. The elastomeric member is subsequently deformable into or out of the depression in response to variations of the pressing of the conductive member against the elastomeric member, of external forces applied to the capacitor, of thermal expansion or contraction of the capacitor, and of electrostriction of the capacitor. In further specific embodiments, the electrode covers the entire surface of the substrate so that the edge of the film and the periphery of the substrate are coterminal around the periphery of both thereof. This end may be achieved by methods described in the above-noted U.S. Pat. No. 3,586,934 to Nakata.

In more specific embodiments, the capacitor has two electrodes, one on either opposed major surface thereof and each electrode has electrical connection made thereto with an elastomeric member and a pressing facility as described above. The present invention also contemplates a capacitor subassembly comprising a plurality of the capacitors just described. Adjacent capacitors are electrically interconnected by conductive elastomeric members therebetween and the exposed electrodes of terminal capacitors are urged toward each other by similar elastomeric conductive members pressed thereagainst. A capacitor assembly may be formed from the subassembly just described by heat shrinking a heat shrinkable tube, or by casting or molding a flexible or semi-flexible tube, about the capacitor subassembly while all of the capacitors and any intervening conductive elastomeric members are pressed together. Preferably, the tube is made of a high dielectric strength material and is heat shrunk or molded so as to be in substantial peripheral engagement with each capacitor of the series. The tube may be filled with a high dielectric strength filler such as an adhesive to insure that no entrapped air or voids remain within the tube adjacent the capacitors. A capacitor rod may be produced by encasing the just-described assembly in an insulative housing. The housing is preferably made of a ceramic or of a thermosetting material, such as cycloaliphatic epoxy resin preferably molded by pressure gelation. The housing supports a pair of opposed circuit-connectable terminals and includes facilities for continuously electrically connecting the terminals to respective terminal elastomeric members of the subassembly. The assembly may be spaced from the interior of the housing and the space therebetween may be filled with a high dielectric strength substance, such as $SF_6$. Lastly, the capacitor rod may be used to produce a capacitive voltage divider. In this event, the voltage divider includes a third circuit-connectable terminal supported by the housing which is continuously electrically connected to the facing films of adjacent capacitors within the assembly.

BRIEF DESCRIPTION OF THE DRAWING

FIG. 1 is a partially-sectioned, side elevation showing a ceramic capacitor according to the prior art;

FIGS. 2-6 illustrate various prior art techniques for effecting electrical connection to and between one or more of the type of ceramic capacitor illustrated in FIG. 1, and also illustrate, in general, techniques for associating ceramic capacitors of the type illustrated in FIG. 1 in a stack to form a capacitor subassembly or assembly;

FIG. 17 is a side elevation, partially-sectioned view of a portion of a capacitor assembly according to the present invention and utilizing the apparatus of FIGS. 7-16;

FIG. 18 is a side elevation, partially-sectioned view of a high-voltage device utilizing the assembly of FIG. 17 and the apparatus of FIGS. 7-16; and FIG. 19 is a side elevation, partially-sectioned view of a high-voltage capacitive voltage divider according to the principles of the present invention utilizing the apparatus of FIGS. 7-18.

DETAILED DESCRIPTION

Figure 7:
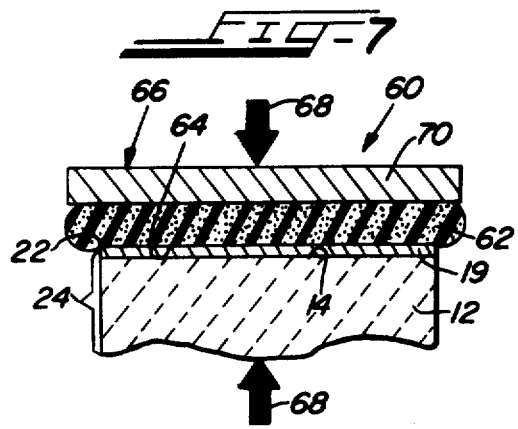
FIGS. 7-11 illustrate improved apparatus for effecting electrical connection to and between capacitors of the type illustrated in FIG. 1 according to the present invention.

In FIG. 1, there is illustrated a ceramic capacitor 10 according to the prior art. The capacitor 10 includes a ceramic substrate 12 on major opposed surfaces 14 and 15 of which there are deposited respective capacitor electrodes 17 and 18. The substrate 12 is preferably chosen from the group of materials having high dielectric constants, and high dielectric strengths, such as barium titanate. The electrodes 17 and 18 comprise thin films of 19 and 20 of conductive material and may comprise dispersions of silver deposited on the surfaces 14 and 15 and adhered thereto by heating. Due to the high dielectric constant and the high dielectric strength of the barium titanate substrate 12, capacitors, such as the capacitor 10 illustrated in FIG. 1, exhibit high capacitances and extremely high withstand voltages even when they are very small.

As more fully described in Nakata, U.S. Pat. No. 3,586,934, until the present invention it was generally preferred that a film, such as the film 19 of the electrode 17, be as precisely coterminal as possible with the periphery of the substrate 12. That is to say, in the prior art it was generally desirable that an edge 22 of the film 19 be aligned and coterminal with the periphery 24 of the substrate 12. The reasons for this are discussed below. Notwithstanding this desire of the prior art, it is very common with ceramic capacitors 10 of the type illustrated in FIG. 1 for a film, such as the film 20 of the electrode 18, to not be coterminal with the edge 24 of the substrate 12. That is, as depicted in FIG. 1, and as shown at 26, the edge 28 of the film 20 terminates short of the periphery 24 of the substrate 12. As discussed by Nakata in the '934 patent, when a high voltage is applied to the ceramic capacitor 10 of FIG. 1 or to a stack 30 of such capacitors, as generally illustrated in FIG. 2, field lines emanating from the edges 22 and 28 of the films 19 and 20 stress the medium immediately adjacent the capacitors 10 and can cause this medium to break down. A break-down in the medium means that it becomes at least momentarily a conductor and flashover across the capacitor 10 may occur which may damage the capacitor 10 or circuitry to which it is connected. According to Nakata in the '934 patent, if the edges 22 and 28 of the films 19 and 20 are precisely coterminal with the periphery 24 of the substrate 12, this problem is alleviated, as will be discussed below.

Illustrated in FIG. 2 is the stack 30 of capacitors 10. The left side of the stack 30 illustrates the goal of the Nakata '934 patent wherein the edges 22 and 28 of the films 19 and 20 and the peripheries 24 of the substrates 12 are all precisely coterminal. The right side of the stack 30 in FIG. 2 illustrates in a greatly exaggerated and magnified fashion how normal size variations in substrates 12 and in the extent of the films 19 and 20 thereon can lead to a variety of conditions where the edges 22 and 28 and the peripheries 24 are not coterminal. The Nakat '934 patent teaches that the condition at the left of the stack 30 in FIG. 2 may be achieved by centerlessly grinding the stack 30 after the individual capacitors 10 have been bonded together in a bonded stack by interposing a conductive adhesive 32 such as a epoxy cement filled with highly dispersed silver (see FIG. 4). After the stack 30 is bonded together, centerless grinding takes place, removing, as illustrated by the line 34, a sufficient amount of the substrates 12 and of the films 19 and 20 thereon so that all of the edges 22 and 28 and peripheries 24 are precisely coterminal.

Referring again to FIG. 1, when a single capacitor 10 is utilized and has high-voltage applied thereto, the edges 22 and 28 of both films 19 and 20 have electric field lines emanating therefrom and, regardless of whether or not these edges 22 and 28 are precisely coterminal with the periphery 24 of the substrate 12, this condition obtains. As pointed out in Nakata '934, the non-coterminal condition of the film 20 in FIG. 1 worsens the electrical stress problem when a plurality of the capacitors 10 are associated together in the stack 30 of FIG. 2. Specifically, the overhanging and underhanging nature of the various films 19 and 20 of the capacitors 10 of the stack 30 will cause air gaps, such as those illustrated at 36, to be highly stressed by the electric field between the facing film 19 or 20 on one capacitor 10 and the substrate 12 of an adjacent capacitor 10.

In apparent recognition of the fact that even when the edges 22 and 28 and the periphery 24 are precisely coterminal as shown at the left of FIG. 2, the electric field lines emanating from the edges 22 and 28 and, nevertheless, stress the surrounding medium and may break it down, Nakata, as shown at the left of FIG. 3, discloses coating the stack 30 with a thin layer or film of a dielectric material 38, such as epoxy, polyester resin, a silicone varnish or a polyester varnish. The purpose of the coating 38 is to supress field emissions and microdischarge initiated breakdowns from the edges 22 and 28 of the films 19 and 20. According to Nakata, the dielectric coating must have a high resistivity, preferably in the neighborhood of $10^8$ ohm-centimeter.

FIG. 3 also illustrates a technique disclosed in Dutta, U.S. Pat. No. 3,731,130, and Folta, U.S. Pat. No. 3,040,385, although not for use with ceramic capacitors. Specifically, as shown at the right of FIG. 3, the stack 30 of capacitors 10 may be enclosed in a heat shrunk tube 40. Considering Nakata '934, it might be attempted to sufficiently shrink the tube 40 into intimate engagement with the edges 22 and 28 and the periphery 24 of the capacitors 10 in the stack 30. Admittedly, following the technique of Nakata in the '934 patent makes the use of either the film 38 or the heat shrunk tube 40 better able to prevent the flashover of the capacitor stack 30 due to electric stress generated at the edges 22 and 28 of the films 19 and 20. However, as shown in FIG. 3, its entirely possible that voids, such as those illustrated at 42, between the film 38 or the tube 40 and the edges 22 and 28 and the periphery 24 may be present. Whether the medium contained in these voids 42 is air or another low dielectric strength and low dielectric constant material, a breakdown thereof may occur, because of the constant stress at the edges 22 and 28. Should this occur, and should the film 38 or the tube 40 not be sufficiently thick, the problem of flashover across one or more of the capacitors 10 in the stack 30 remains. Moreover, as shown at the right in FIG. 3, whether the film 38 and the tube 40 are used, if the technique of Nakata '934 is not utilized, the problem of voids 42 may be worsened at those places where the film 38 or the tube 40 attempts to follow non-aligned edges 22 and 28.

It should also be pointed out that a portion of the technique of Nakata '934 insofar as it utilizes a conductive adhesive 32 (FIG. 4) between the films 19 and 20 of adjacent capacitors 10 in the stack 30 presents an additional disadvantage. Specifically, as is well known, suitable ceramic substrates 12, such as those made of barium titanate, because of their piezoelectric properties are subject to electrostriction. That is, during charging or discharging of the capacitors 10 having ceramic substrates 12, especially at high voltage, the dimensions of the substrate 12 may increase or decrease. Further, it is also well known that ceramic substrates 12, such as those made of barium titanate, are temperature sensitive in that temperature changes may also cause rather large dimensional changes. Given these properties of barium titanate ceramic substrates 12, it should be apparent that should radial dimensional changes occur in the stack 30 of the capacitors 10 in which the adhesive 32 has been utilized, and if the radial dimensional changes of adjacent capacitors 10 are not the same, there is a high probability that the adhesive 32 will crack, break or pull loose.

The Mankoff-Nakata U.S. Pat. No. 3,325,708 and Nakata U.S. Pat. No. 3,670,222 present alternatives to Nakata '934 which may alleviate this last-noted problem. Specifically, both of these patents disclose apparatus as generally depicted in FIG. 5, wherein adjacent capacitors 10 in a capacitor stack 30 are electrically interconnected via their facing films 19 and 20 by a conductive button 44. Also, as shown in FIG. 5, each individual capacitor 10 of the stack 30 has its outer periphery surrounded by a flanged, toroidal member 46 which intimately engages the edges 22 and 28 of the films 19 and 20 as well as the periphery 24 of the ceramic substrate 12. The flanges of the member 46 partially cover the films 19 and 20, leaving an open space 48 centrally thereof through which the conductive button 44 passes. The difficulty, however, of voids, such as the voids 42 illustrated in FIG. 3, still exists; see FIG. 3 of Nakata '222.

Some prior art devices utilizing stacks 30 of ceramic capacitors 10 firmly mount each end of the stack 30 within an insulative housing. This creates a problem in addition to that caused by radial dimensional changes where the adhesive 32 of Nakata '934 is used. Specifically, firmly mounting both ends of the stack 30 may cause damage to the individual capacitors 10 thereof due to axial dimensional changes of the stack 30 caused, for example, by electrostriction or temperature-dependent dimensional changes. In order to alleviate these axial stresses, structure as generally illustrated in FIG. 6 is used, as disclosed by Nakata '222, Mankoff-Nakata '708, and Nakata '934. Briefly, FIG. 6 illustrates a stack 30 of capacitors 10 within an insulative housing 50. A pair of terminals 52 and 53 may engage the exposed terminal films 19 and 20 at opposite ends of the stack 30 and one of the terminals, such as the terminal 53 may be electrically connected to a ferrule 54 by a spring 55. The use of the spring 55 permits axial dimensional changes in the stack 30 without applying an undue amount of axial force to the stack 30. The spring also may prevent or minimize damage to the substrates 12 of the capacitors 10 in the stack 30 should the housing 50 be dropped.

As can be seen from the above discussion, devices utilizing stacks 30 of ceramic capacitors 10 according to the prior art are complicated to make and are subject to various operating deficiencies.

According to the present invention, connecting apparatus is provided which renders quite convenient the manufacture of the stack 30 of the ceramic capacitors 10 and which eliminates or substantially alleviates all of the operational problems of the prior art devices.

Figure 8:
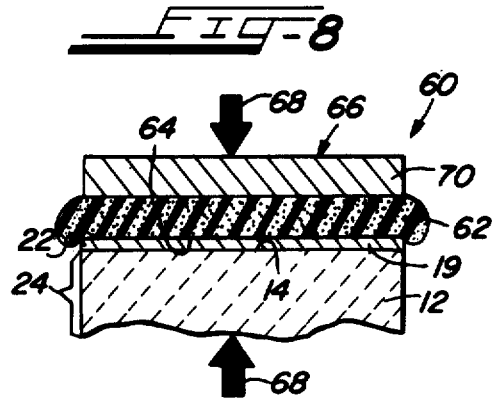

Referring now to FIGS. 7 and 8, there are shown facilities 60 for rendering convenient electrical connection to the films 19 and 20 of the ceramic capacitor 10. The facilities include an elastomeric conductive member 62 which may be made of conductive rubber available from Flexan Corporation of Chicago, Ill. under the designation "Formular #66X119F3" or from AARCO Products Corporation, Chicago, Ill. under the designation "conductive neoprene rubber." As shown in FIGS. 7 and 8, the elastomeric conductive member 62 has a contact surface 64 having a configuration similar to, but a size larger than, the area of the film or films 19 or 20 to which electrical connection is to be made. As should be obvious, the film 19 or 20 may have a circular, square, or other areal shape; so too may the contact surface 64. Facilities 66 are provided for pressing the contact surface 64 of the elastomeric member 62 sufficiently hard against the surface area of the film 19 or 20 across an interface therebetween to effect good mechanical and electrical contact between the contact surface 64 and the film 19 or 20. The facilities 66 also press the contact surface 64 sufficiently hard against the film 19 or 20 to deform the contact surface 64 over the edge 22 or 28 of the film 19 or 20 and into good mechanical and electrical contact therewith. The elastomeric member 62 is pushed with sufficient force toward the film 19 or 20, as illustrated by the arrows 68, so that the contact between itself and the edge 22 or 28 leaves no gaps or voids between the contact surface 64 and such edges 22 or 28, as well as (FIG. 8) between the member 62 and the surface 14 or 15 of the substrate where the edge of the film 19 or 20 is not coterminal with the periphery 24 of the substrate 12.

In FIG. 7, the capacitor 10 illustrated is one which has been centerlessly ground or the like pursuant to Nakata '934 so that the edges 22 and 28 of the films 19 and 20 are precisely coterminal with the periphery 24 of the substrate 12. In FIG. 8, it is assumed that the technique of the Nakata '934 patent has not been used and that the edges 22 and 28 of the films 19 and 20 are not coterminal with, and end short of, the periphery 24 of the substrate 12.

Figure 9:
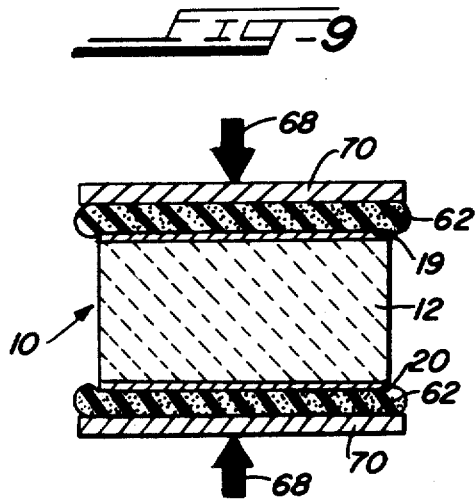
Figure 10:
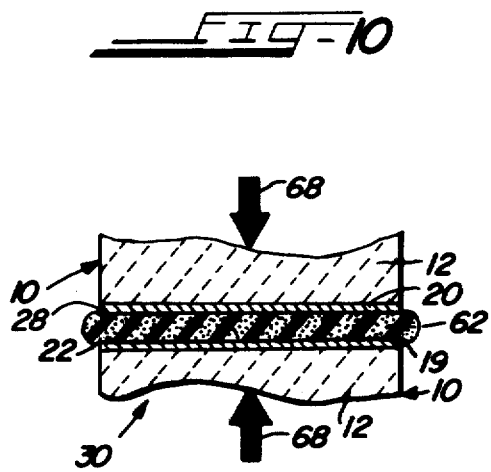

The pressing facilities 60 may comprise a metal member such as a terminal or plate 70 which is pressed against the elastomeric member 62. The plate 72 receives force for the pressing of the elastomeric member 62 against the film 19 or 20, as illustrated by the arrows 68. Instead of the plate 70, the pressing facility 60 may comprise an adjacent capacitor 10. Specifically, and referring to FIG. 10, it will be seen that the plate 70 is not present between adjacent capacitors 10. Rather, as illustrated by the arrows 68, the two adjacent capacitors 10 of a stack 30 are pressed together to compress the elastomeric conductive member 62 and its contact surfaces 64 into firm engagement with the facing films 19 and 20, including the edges 22 and 28 thereof. Clearly, in a stack 30 of capacitors 10, as illustrated in FIG. 2, the intermediate capacitors 10, that is, those capacitors 10 other than the capacitors at either end of the stack 30, may be interconnected to the capacitors adjacent thereto by the technique illustrated in FIG. 10. The terminal or end capacitors 10 of the stack 30, may utilize the techniques illustrated in FIGS. 7 and 8 for effecting electrical interconnection thereto. For use of the stack 30 in an electrical device, appropriate facilities (not shown in FIGS. 7–10) may be used to continuously interconnect circuit connectable terminals of the device to the respective plates 70. FIG. 9 illustrates a single capacitor 10, the two films 19 and 20 of which are respectively electrically connected to respective plates 70, which by appropriate facilities (not shown) may be connected to an electric circuit.

Figure 11:
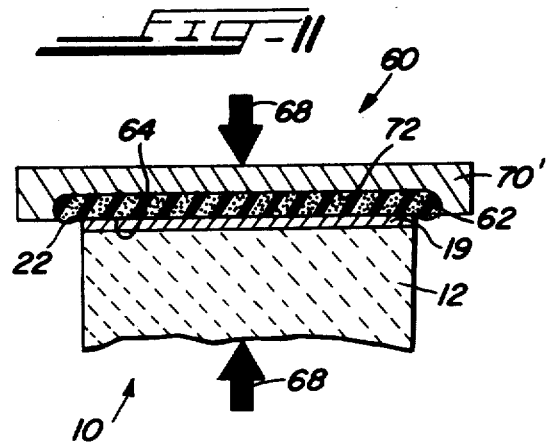

FIG. 11 illustrates an embodiment of the present invention which is alternative to the embodiments depicted in FIGS. 7–9. Specifically, in FIG. 11, a modified plate 70' is used. The modified plate 70', rather than being planar as are the plates 70 in FIGS. 7-9, has a cup-shaped concavity 72 formed therein. The concavity 72 is pressed against the elastomeric member 62 as shown by the arrows 68. The contour of the concavity 72 may be selected or adjusted so as to conveniently assure that the contact surface 64 of the elastomeric member 62 engages both the surface of the film 19 or 20, as well as its edge 22 or 28.

FIGS. 12–16 illustrate facilities which are modifications of those shown in FIGS. 7–11 in which not only good electrical contact with the films 19 or 20 of a capacitor 10 are effected, but also in which dimensional changes of the capacitors 10 or of a stack 30 of the capacitors 10 do not adversely affect the brittle substrates 12.

Figure 12:
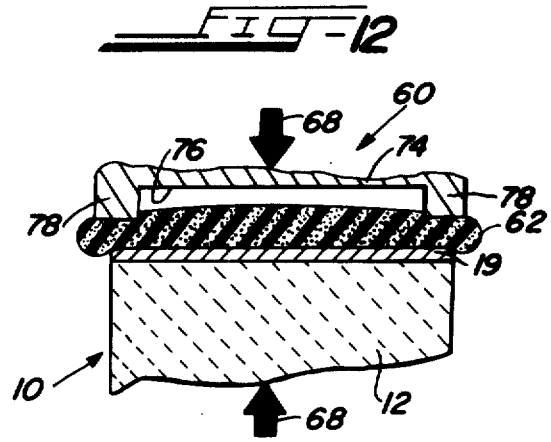
FIGS. 12-16 illustrate alternative embodiments of the apparatus depicted in FIGS. 7-11 for effecting electrical connection to and between capacitors of the type illustrated in FIG. 1, and additionally show how the apparatus may be modified for minimizing or eliminating mechanical stress on the capacitors which could otherwise damage them.

In FIG. 12, there is illustrated a pressing facility 60, a plate 74 of which is similar to the plate 70' shown in FIG. 11, but a concavity of which is not necessarily filled by the elastomeric member 62, as shown in FIG. 11. Specifically in FIG. 12, the plate 74 is formed with a depression 76 therein. The depression 76 is defined by a protruding portion 78 of the plate 74. The protruding portion 78, as shown in FIG. 12, overlies the edge of the film 19 or 20 and pushes the outer portions of the elastomeric member 62 more firmly into engagement with the film 19 or 20 at its edge 22 or 28 than is the central portion of the member 62. Should the dimension of the capacitor 10, or a stack 30 in which the capacitor 10 is included, change due to electrostriction, thermal phenomena, or otherwise, the elastomeric member 62 may deform into or out of the depression 76 to compensate therefor. Thus, the depression 76 in the plate 74 provides a volume into or out of which the elastomeric member 62 may deform should the capacitor 10 or the stack 30 in which it is included dimensionally change.

Figure 13:
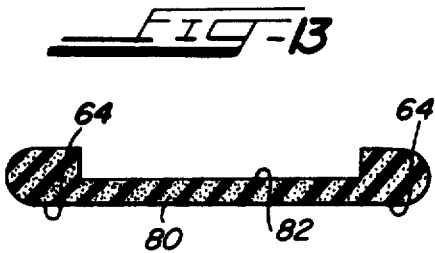
Figure 14:
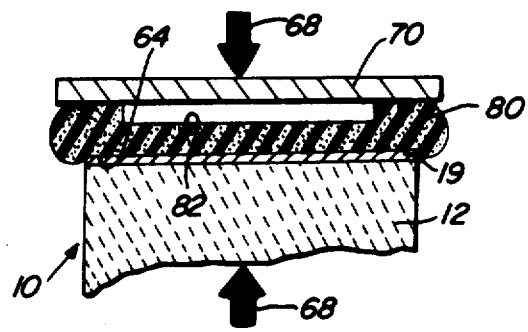

FIG. 14 illustrates the use of a variant elastomeric conductive member 80 which is depicted by itself in FIG. 13. Similar to the plate 74 in FIG. 12, the elastomeric member 80 of FIGS. 13 and 14 has formed therein a depression 82. The depression 82 may either face the plate 70, as shown in FIG. 14, or may face the film 19 or 20 against which it is to be pressed. Assuming that use is made of the elastomeric member 80 as shown in FIG. 14, it will be noted that the depression 82 serves the same function as the depression 76 in the plate 74 of FIG. 12. Specifically, after the elastomeric member 80 is pressed against the film 19 or 20 and its edge 22 or 28, dimensional changes in the capacitor 10, or the stack 30 in which it was included, permits the elastomeric member 80 to deform into or out of the depression 82, thus compensating for such dimensional changes.

Figure 15:
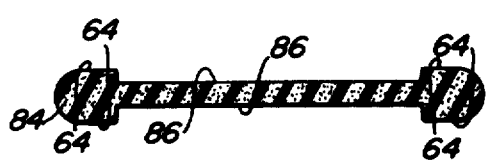
Figure 16:
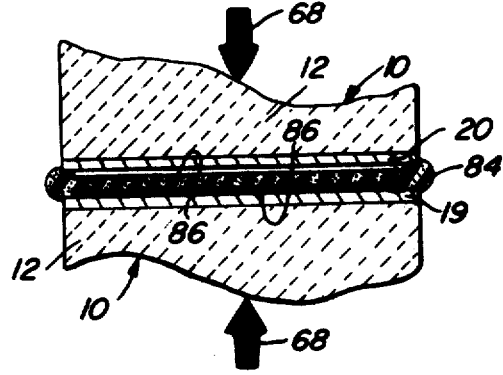

FIG. 15 illustrates an elastomeric member 84 in which two depressions 86 have been formed. The function served by the elastomeric member 84 in FIG. 15 is similar to that formed by the elastomeric member 80 of FIGS. 13 and 14, except that the elastomeric member 84 of FIG. 15 is especially suited for placement between, and pressing against the films 19 and 20 of, adjacent capacitors 10, as illustrated in FIG. 16. In the case of the elastomeric member 84 of FIG. 15, the contact surfaces 64 are at the outer portion thereof.

Referring now to FIG. 17, there is shown a portion of an assembly 88 which may form a portion of high-voltage devices depicted in FIGS. 18 and 19. The assembly 88 includes a stack 30 or subassembly of individual capacitors 10 which may be serially, electrically conencted together utilizing the techniques of previously described FIGURES. The facing films 19 and 20 of adjacent intermediate capacitors 10 are interconnected electrically by one of the elastomeric members 62, 80 or 84. Only one of the terminal capacitors 10, that is, the capacitor 10 shown at the bottom end of the stack 30, is shown in FIG. 17. Pressed against the surface area of the film 20 and against the edge 28 thereof is an elastomeric member 62 which takes the general form of that shown in FIGS. 7 and 12. In FIG. 17, the stack 30 of capacitors 10 has been subjected to the centerless grinding technique of the Nakata '934 patent. A member 90 is utilized to press the elastomeric member 62 against the surface area of the film 20 and its edge 28. The member 90 combines features of the plates 70' and 74, illustrated in FIGS. 11 and 12, respectively. Specifically, the member 90 includes a main body portion 91 in which there is formed both a concavity 92, which is similar to the concavity 72 in FIG. 11, and a slightly smaller, coaxial depression 93, similar to the depression 76 in FIG. 12. Similar to FIG. 11, the concavity 92 encompasses the majority of the volume of the elastomeric member 62 to ensure good electrical and mechanical contact between the elastomeric member 62 and the surface area of the film 20 and its edge 28. The depression 93 serves a function similar to that served by the depression 76 in FIG. 12, namely, that of providing a volume into and out of which the elastomeric member 62 may deform in the event of dimensional changes in the stack 30 of capacitors 10 due to thermal or electrostriction effects. The body 91 of the member 90 may also include a threaded or tapped hole 94. A threaded portion of a terminal (not shown) of a high-voltage device in which the assembly 88 is used may be threaded into the hole 94 when the device is assembled While the stack 30 of capacitors 10 and the elastomeric members 62, 80 or 84 used in making electrical connection therebetween and thereto are held in the compressed state necessary to achieve the conditions illustrated in FIGS. 7-12, 14 or 16, a heat shrinkable tube 96, which may be similar to the tube 40 in FIG. 3, is placed around the entire stack 30 of capacitors 10. The tube 96 may also be a flexible or semiflexible material which is molded or cast about the stack 30. As shown in FIG. 17, the tube 96 preferably surrounds both the stack 30 of the capacitors 10 and the member 90. Following the placement of the tube 96 about the stack 30 and the member 90, the tube 96 is heat shrunk (or may be molded) to assume the general configuration shown in FIG. 17. Shrinking (or molding) of the tube 96 occurs while compressive force is applied to the stack 30, as indicated by the arrows 68. Once the tube 96 has been shrunk (or molded), the compressive force indicated by the arrows 68 may be removed as the tube 96 will now hold the assembly 88 in its proper compressed condition. Preferably, the tube 96 is a material having high dielectric strength and a high dielectric constant and may be selective from the group consisting of polyolefin, silicone and ethylene propylene diene copolymer (EPDM). If desired, before heat shrinking (or molding) of the tube 96 occurs, the space between the tube 96 and the stack 30, as well as spaces between the tube 96 and the member 90, may have an adhesive 98 or the like placed therein. During the shrinking (or molding) of the tube 96, some of the adhesive 98 will be squeezed out as the volume between the stack 30 and the tube 96 decreases. If heat shrinking of the tube 96 is performed in a vacuum oven, this process leads to an assembly 88, including the 96 and the adhesive 98 between the tube 96 and the stack 30 in which there are no voids, spaces or gas bubbles.

Referring now to FIG. 18, there is shown a high voltage device 100 which is a capacitor rod utilizing the techniques illustrated in FIG. 17. The device 100 includes an assembly 88 similar to that shown in FIG. 17. The assembly 88 includes a stack or subassembly 30 of individual ceramic capacitors 10 which are electrically interconnected by any of the techniques illustrated in FIGS. 7-12, 14, or 16. Only some of the elastomeric conductive members 62, 80 or 84 used to electrically interconnect the connectors of the stack 30 shown. The tube 96 of FIG. 17 is depicted in FIG. 18 and surrounds the stack 30 of capacitors 10, as well as a member 102 which is similar, in general, to the member 90 of FIG. 17 but has some specific differences.

The member 102 comprises a terminal-like body portion 104 having a depression 106 formed therein. The depression 106 contains a toroidal or washer-like shim 108. The size of the depression 106 and of the shim 108 are chosen so that the shim 108 bears against the elastomeric conductive member 62 at the outer portion thereof to firmly press this member 62 against the outer portion of the film 20 (not numbered in FIG. 18) of the terminal capacitor 10 at the left end of the stack 30. As in earlier described FIGURES, the contact surface 64 of the elastomeric member 62 is also pressed into firm mechanical and electrical engagement with the edge 28 of the film 20. A volume 110 is defined within the central portion of the shim and serves the same function of the depression 76 in FIG. 12. That is, the elastomeric member 62 may deform or be extruded into or out of the volume 110 in response to dimensional changes in the stack 30 of capacitors 10. Unlike the member 90 of FIG. 17, the member 102 of FIG. 18 does not include the tapped hole 94. Rather, electrical connection is made between the body portion 104 of the member 102 to an external terminal 112 of the device 100 by means of a conductive compression spring 114 residing in a blind bore 116 formed in the terminal 112. The use of both the spring 114 and the volume 110 enable to device 100 to tolerate dimensional changes in the stack 30 of capacitors 10 due to, for example, electrostriction or thermal effects. The terminal 112 is held in and mounted to an insulative housing 118 for the device 100 which also surrounds the assembly 88. The mounting of the terminal 112 to the housing 118 may be achieved in any convenient fashion. The terminal 112 is, of course, connectable to an appropriate portion of an electric circuit in which the capacitor assembly 88 is used.

As with the embodiment of the present invention described with reference to FIG. 17, in the embodiment of FIG. 18, the adhesive 98 may be present between the tube 96 and the capacitor stack 30. A space or volume 120 may exist between the interior of the housing 118 and the capacitor assembly 88. Depending upon the voltages at which the device 100 is used, this space may contain air or a high dielectric strength gas, such as $SF_6$. A terminal 122 at the right end of the housing 118 is electrically connected to the other terminal capacitor at the right end of the capacitor stack 30 in a manner not illustrated in FIG. 18, but which may be similar to that depicted at the left of FIG. 18 or in FIG. 17.

Referring now to FIG. 19, there is shown a high-voltage capacitive voltage divider 124 which may utilize a capacitor assembly 88', which is similar to the capacitor assembly 88 of FIG. 17.

The voltage divider 124 includes an insulator 126, preferably made out of a cycloaliphatic epoxy resin. The insulator 126 may include a plurality of leakage-distance-increasing skirts 128. Molded within and contained by the insulator 126 is the capacitor assembly 88'.

The capacitor assembly 88' includes the stack 30 of capacitors 10, electrical connection between adjacent ones of which may be effected by any of the techniques illustrated in FIGS. 7-12, 14 or 16. The upper, terminal or end capacitor 10 has electrical connection to its film 19 made by the elastomeric member 80, as illustrated in FIG. 13, and as utilized in FIG. 14. A member 130, similar to the member 90 of FIG. 17, is utilized. The member 130 includes a main body portion 131 which is molded into the insulator 126, and which contains the threaded hole 94 similar to that shown in FIG. 17. The threaded hole 94 is exposed for connection of the member 130 to a threaded stud or the like (not shown) in the use environment for the voltage divider 124. The member 130 also includes a projection 132 which serves the function of the plate 70 in FIG. 14. The depression 82, defined by the elastomeric member 80, is positioned at the interface between the elastomeric member 80 and the projection 132.

The capacitor stack 30 is surrounded by a tube 96 similar to that shown in FIGS. 17 and 18. The adhesive 98 may be present between the tube 96 and the capacitor stack 30. The tube 96 also surrounds the projection 132 and is partially fitted into an annular space 134 defined between the main body 131 and the projection 132 of the member 130. A space exists between the terminus of the tube 96 and the end of the space 134. Thus, the tube 96 is free to expand or contract within the space 134 as the tube 96 dimensionally changes due to heating thereof by the capacitor stack 30 and subsequent cooling.

The lower, terminal or end capacitor 10 of the stack 30 has pressed thereagainst an elastomeric member which may take the configuration of the member 62 depicted in FIGS. 7-10. As should be obvious, the elastomeric member may also take the form of the members 80 and 84 depicted in FIGS. 13 and 15. Pressed against the elastomeric member 62 is one side of a metal spacer which may take the form of the plate 70 depicted in FIGS. 7-9, 11 or 14. The other side of the plate 70 presses against an elastomeric member 62, which may also take the form of the member 80 or 84. The lower elastomeric member 62 presses against the film 19 of a single ceramic capacitor 10 below the backing plate 70. The film 20 (not visible in FIG. 19) of this single capacitor 10 has pressed thereagainst an elastomeric member similar to the member 80, shown in FIG. 13, which may, of course, also be configured like the member 62 or 84. The depression 82 defined by the lower elastomeric member 80 resides at the interface between the member 80 and the projection 132 of a lower member 130, similar in most respects to the upper member 130. The main body 131 of the lower member 130 is also surrounded by and molded into the insulator 126. Thus, the plate 70 lies between the capacitor stack 30 which includes a plurality of electrically series-connected capacitors 10 and the single lower capacitor 10.

An electrical conductor 138, attached by soldering or the like to the side of the plate 70 passes through the insulator 126 and is electrically connected at its other end to an electrical terminal 140 molded into the insulator 126. If the voltage divider 124 is connected to an electrical circuit via the threaded holes 94 in the the members 130, the output voltage of the voltage divider 124 taken from the terminal 140 depends upon the ratio of the capacitance of the single capacitor 10 to the capacitance of the capacitor stack 30.

Obviously, the path taken by the conductor 138 may be as shown in FIG. 19, that is, passing from the plate 70 downwardly along the interior surface of the tube 96 and then past the lower terminus thereof through the insulator 126 to the terminal 140. The conductor 148 may also pass through a small hole formed through the tube 96 for more direct routing to the terminal 140.

The insulator 126 may be included in high-voltage gear and may be used to support an electrical element thereof, such as a contact assembly or a switch assembly. In this event, both necessary mechanical and electrical connections are made via the threaded holes 94 in the members 130. The entire assembly 88' may be produced in the same manner as that by which the assembly 88 of FIG. 17 is produced.

We claim:

1. Apparatus for making electrical connection to an electrode of a ceramic capacitor which includes a high dielectric strength, high dielectric permittivity ceramic substrate; the electrode being a thin conductive film deposited on a surface of the substrate and having a predetermined configuration and a predetermined surface area peripherally bounded by an edge of the film where the surface and and a side wall of the film intersect, the side wall having a small height dimension; the apparatus comprising:
    an elastomeric conductive member having a contact surface which is similar in configuration to, but larger than, the surface area of the film; and means for pressing the contact surface of the elastomeric member sufficiently hard against the surface area of the film across an interface therebetween to effect good mechanical and electrical contact between the contact surface and the film and to deform the contact surface over the edge of the film and into good mechanical and electrical contact therewith, so that electrical stress concentrations at the edge of the film are minimized.

2. Apparatus as in claim 1, wherein
the pressing means comprises:
   a conductive member, an end of which is urged toward the film and against the elastomeric member opposite the contact surface thereof, the end of the conductive member having an area at least as large as the area of the film.

3. Apparatus as in claim 2, which further comprises:
means for ensuring that the contact surface remains in firm mechanical and electrical contact with the edge of the film and for minimizing mechanical stress which may be applied to the substrate, both notwithstanding variations in the pressing of the conductive member against the elastomeric member, the application of external forces to the capacitor, thermal expansion or contraction of the capacitor, and electrostriction of the capacitor.

4. Apparatus as in claim 3, wherein
the ensuring and minimizing means comprises
   a depression formed in the conductive member or in the elastomeric member or in both and located at the interface therebetween when they are urged together, the depression generally overlying a central portion of the area of the film when the film and the elastomeric member are pressed together, the elastomeric member being initially slightly deformed into the depression due to the urging thereagainst of the conductive member, and being further deformable into or out of the depression in response to variations in the pressing of the conductive member against the elastomeric member, the external forces applied to the capacitor, the thermal expansion of the capacitor, and the electrostriction of the capacitor.

5. Apparatus as in claim 1, 2, 3 or 4, wherein
the electrode is a thin conductive film covering the entire surface of the substrate so that the edge of the film and the periphery of the substrate are coterminal around the peripheral boundary of both thereof.

6. Apparatus as in claim 5, wherein
the surface of the substrate is generally planar.

7. Apparatus for making respective electrical connections to a pair of electrodes of a ceramic capacitor which includes a high dielectric strength, high dielectric permittivity ceramic substrate; the electrodes being thin conductive films deposited on opposed surfaces of the substrate and each having a predetermined configuration and a predetermined surface area peripherally bounded by a edge of the film where the surface and a side wall of the film intersect, the side wall having a small height dimension; the apparatus comprising:
   a first elastomeric conductive member having a contact surface which is similar in configuration to, but larger than, the surface area of one of the films;
   first means for pressing the contact surface of the first elastomeric member sufficiently hard against the surface area of the one film across an interface therebetween to effect good mechanical and electrical contact between the contact surface and the one film and to deform the contact surface over the edge of the one film and into good mechanical and electrical contact therewith, so that the electrical stress concentrations at the edge of the one film are minimized;
   a second elastomeric conductive member having a contact surface which is similar in configuration to, but larger than, the surface area of the other film; and
   second means for pressing the contact surface of the second elastomeric member sufficiently hard against the surface area of the second film across an interface therebetween to effect good mechanical and electrical contact between the contact surface and the other film and to deform the contact surface over the edge of the other film and into good mechanical and electrical contact therewith; so that electrical stress concentrations at the edge of the other film are minimized.

8. Apparatus as in claim 7, wherein
each pressing means comprises:
   a conductive member, an end of which is urged toward its film and the other conductive member and against its elastomeric member opposite the contact surface thereof, the end of each conductive member having an area at least as large as the area of its film.

9. Apparatus as in claim 8, which further comprises:
means for ensuring that each contact surface remains in firm mechanical and electrical contact with the edge of its film and for minimizing mechanical stress which may be applied to the substrate, both notwithstanding variations in the pressing of the conductive members against the elastomeric members, the application of external forces to the capacitor, thermal expansion or contraction of the capacitor, and electrostriction of the capacitor.

10. Apparatus as in claim 9, wherein
each ensuring and minimizing means comprises:
   a depression formed in either the conductive member or in its elastomeric member or in both and located at the interface therebetween when they are urged together, the depression generally overlying a central portion of the area of its film when its film and its elastomeric member are pressed together, each elastomeric member being initially slightly deformed into its depression due to the urging thereagainst of its conductive member, and being further deformable into or out of its depression in reponse to variations in the pressing of its conductive member against its elasomeric member, the external forces applied to the capacitor, the thermal expansion of the capacitor, and the electrostriction of the capacitor.

11. Apparatus as in claim 7, 8, 9 or 10 wherein
each electrode is a thin conductive film covering its entire surface of the substrate so that the edge of each film and the periphery of the substrate are coterminal around the peripheral boundary of both thereof.

12. Apparatus as in claim 11, wherein
the surfaces of the substrate are generally planar and parallel.

13. A capacitor subassembly comprising a plurality of capacitors and electrical connection apparatus as set forth in claim 7, the capacitors being aligned so that the surface areas of their films are generally parallel in a stack of a series of adjacent capacitors, the stack including a terminal capacitor at either end and, if the stack includes three or more capacitors, one or more intermediate capacitors between the terminal capacitors, wherein:

the first elastomeric member of each intermediate capacitor is the second elastomeric member of one adjacent capacitor, which one adjacent capacitor is the first pressing means for the first elastomeric member, and the second elastomeric member of each intermediate capacitor is the first elastomeric member of the other adjacent capacitor, which other adjacent capacitor is the second pressing means for the second elastomeric member, the second elastomeric member of one terminal capacitor is the first elastomeric member of the adjacent intermediate capacitor and the first elastomeric member of the other terminal capacitor is the second elastomeric member of the adjacent intermediate capacitor.

14. A capacitor subassembly as in claim 13, wherein the first pressing means for the one terminal capacitor acts against the first elastomeric member thereof and the second pressing means for the other terminal capacitor acts against the second elastomeric member thereof, the last noted pressing means acting toward each other to compress the stack of capacitors so that each film and its adjacent elastomeric member are pressed together.

15. A capacitor subassembly as in claim 14, which further comprises:

means for ensuring that each contact surface of each elastomeric member remains in firm mechanical and electrical contact with the edge of its film and for minimizing mechanical stress which may be applied to the substrates, both notwithstanding variations in the pressing of each pressing means against its elastomeric member, the application of external forces to the subassembly, thermal expansion and contraction of the capacitors, and electrostriction of the capacitors.

16. A capacitor subassembly as in claim 15, wherein the ensuring and minimizing means comprises:

one or more of (a) a depression formed in either or both the first pressing means or the first elastomeric member for the one terminal capacitor, (b) a depression formed in either or both the second pressing means or the second elastomeric member for the other terminal capacitor, and (c) a depression formed in one or both contact surfaces of one or more of the elastomeric members adjacent the intermediate capacitors, each depression so formed being located at the interface between its pressing means and its elastomeric member, each depression generally overlying a central portion of the area of its film when its film and its elastomeric member are pressed together, its elastomeric member being initially slightly deformed into the depression due to the urging thereagainst of the pressing means, and being further deformable into and out of the depression in response to variations in the pressing of its pressing means against its elastomeric member, the external forces applied to the subassembly, the thermal expansion and contraction of the capacitors, and the electrostriction of the capacitors.

17. A capacitor subassembly as in claim 13, 14 or 15, wherein each electrode is a thin conductive film covering the entire surface of its substrate so that the edge of the film and the periphery of the substrate are coterminal around the peripheral boundary of both thereof.

18. A capacitor subassembly as in claim 17, wherein the surfaces of each substrate are generally planar.

19. A capacitor assembly including the subassembly of claim 18, and further comprising:

a tube formed or shrunk about the stack of capacitors while each pressing means presses against its elastomeric member due to the application of opposed forces on the terminal capacitors so as to maintain this condition after removal of the opposed forces.

20. An assembly as in claim 19, wherein the tube is made of a high dielectric strength material and is formed or shrunk so as to be in substantial peripheral engagement with each capacitor of the series.

21. An assembly as in claim 20, which further comprises a high dielectric strength filler within the tube and filling any voids between the tube and the capacitors.

22. An assembly as in claim 21, wherein the filler is an adhesive.

23. An assembly as in claim 21, wherein the filler is a fluid.

24. A capacitor rod including the assembly of claim 20 and further comprising an insulative housing surrounding the assembly, a pair of opposed circuit-connectable terminals supported by the housing, and means for continuously electrically connecting one of the terminals to the first elastomeric member of the one terminal capacitor and for continuously electrically connecting the other terminal to the second elastomeric member of the other terminal capacitor.

25. A capacitor rod as in claim 24, wherein the housing is a ceramic material.

26. A capacitor rod as in claim 24, wherein the housing is a thermosetting material molded about the assembly.

27. A capacitor rod as in claim 24, wherein the assembly is spaced from the interior of the housing which is filled with a high dielectric strength substance.

28. A capacitor rod as in claim 27, wherein the substance is $SF_6$.

29. A capacitive voltage divider including the capacitor rod of claim 24, and further comprising:

a third circuit connectable terminal supported by the housing, and means for continuously electrically connecting the third terminal to the facing films of two adjacent capacitors of the subassembly.

30. A voltage divider as in claim 29, wherein the housing is a ceramic material.

31. A voltage divider as in claim 29, wherein the housing is a thermosetting material molded about the assembly.

32. A voltage divider as in claim 29, wherein the connecting means for the third terminal comprises:

the first elastomeric member urged against the second film of one of the adjacent capacitors, the second elastomeric member urged against the first film of the other adjacent capacitor, a metal spacer positioned between and urged against the first and second elastomeric members, and a conductor passing through the housing and attached at one end to the spacer and at other end to the third terminal.

* * * * *